US011287342B2

(12) United States Patent
Sullivan et al.

(10) Patent No.: US 11,287,342 B2
(45) Date of Patent: Mar. 29, 2022

(54) CAPACITANCE MANOMETER WITH IMPROVED BAFFLE FOR IMPROVED DETECTION ACCURACY

(71) Applicant: MKS Instruments, Inc., Andover, MA (US)

(72) Inventors: Philip W. Sullivan, Lexington, MA (US); Sergei Syssoev, Newton, MA (US); Ethan E. Mattor, Andover, MA (US); Swaminathan Venkatesan, Somerville, MA (US); Paul D. Lucas, Byfield, MA (US)

(73) Assignee: MKS Instruments, Inc., Andover, MA (US)

( * ) Notice: Subject to any disclaimer, the term of this patent is extended or adjusted under 35 U.S.C. 154(b) by 21 days.

(21) Appl. No.: 16/825,994

(22) Filed: Mar. 20, 2020

(65) Prior Publication Data

US 2021/0293644 A1 Sep. 23, 2021

(51) Int. Cl.
G01L 9/00 (2006.01)
G01L 13/02 (2006.01)
G01L 9/12 (2006.01)
G01N 27/22 (2006.01)

(52) U.S. Cl.
CPC .............. G01L 9/0073 (2013.01); G01L 9/12 (2013.01); G01L 13/025 (2013.01); G01N 27/227 (2013.01)

(58) Field of Classification Search
None
See application file for complete search history.

(56) References Cited

U.S. PATENT DOCUMENTS

| 4,499,773 | A | 2/1985 | Crampton et al. |
| 4,785,669 | A | 11/1988 | Benson et al. |
| 4,823,603 | A | 4/1989 | Ferran et al. |
| 5,271,277 | A | 12/1993 | Pandorf |
| 5,396,803 | A | 3/1995 | Ferran |
| 5,625,152 | A | 4/1997 | Pandorf et al. |
| 5,808,206 | A | 9/1998 | Pandorf et al. |
| 5,911,162 | A | 6/1999 | Denner |

(Continued)

FOREIGN PATENT DOCUMENTS

| JP | 2002544514 A | 12/2002 |
| KR | 101945923 B1 | 2/2019 |

OTHER PUBLICATIONS

A PCT/US2021/017214 International Search Report, dated May 13, 2021, 4 pages.

(Continued)

Primary Examiner — Lisa M Caputo
Assistant Examiner — Nigel H Plumb
(74) Attorney, Agent, or Firm — Brian F. Swienton

(57) ABSTRACT

A capacitive manometer offering improved measurement accuracy is disclosed which includes at least one electrode structure having an inner electrode structure and an outer electrode structure separated by at least one gap, at least one flexible diaphragm having at least one conductive material positioned thereon or integrated therein may be positioned in movable relation to the electrode structure and in proximity to the electrode structure, and at least one non-planar baffle less prone to transient measurement errors having an inner baffle structure and an outer baffle structure separated by at least one baffle orifice positioned distantly from the electrode structure proximate to the flexible diaphragm.

20 Claims, 12 Drawing Sheets

(56) References Cited

U.S. PATENT DOCUMENTS

| | | |
|---|---|---|
| 5,932,332 A | 8/1999 | Pandorf et al. |
| 5,942,692 A | 8/1999 | Haase et al. |
| 5,965,821 A | 10/1999 | Grudzien |
| 6,029,525 A | 2/2000 | Grudzien |
| 6,105,436 A | 8/2000 | Lischer et al. |
| 6,443,015 B1 | 9/2002 | Poulin et al. |
| 6,464,791 B1 | 10/2002 | Van de Kerkhof |
| 6,568,274 B1 | 5/2003 | Lucas et al. |
| 6,672,171 B2 | 1/2004 | Gu et al. |
| 6,735,845 B2 | 5/2004 | Jonsson |
| 6,901,808 B1 | 6/2005 | Sharpless et al. |
| 6,909,975 B2 | 6/2005 | Dozoretz et al. |
| 6,993,973 B2 | 2/2006 | Lischer et al. |
| 7,000,479 B1 | 2/2006 | Poulin et al. |
| 7,137,301 B2 | 11/2006 | Grudzien |
| 7,155,803 B2 | 1/2007 | Jonsson |
| 7,201,057 B2 | 4/2007 | Agami |
| 7,284,439 B2 | 10/2007 | Jonsson |
| 7,316,163 B2 | 1/2008 | Grudzien |
| 7,389,697 B2 | 6/2008 | Jonsson |
| 7,451,654 B2 | 11/2008 | Maiorana et al. |
| 7,624,643 B2 | 12/2009 | Grudzien |
| 7,706,995 B2 | 4/2010 | Sullivan et al. |
| 7,757,563 B2 | 7/2010 | Grudzien |
| 8,704,538 B2 | 4/2014 | Grudzien |
| 2004/0099061 A1 | 5/2004 | Jonsson |
| 2004/0211262 A1 | 10/2004 | Jonsson |
| 2005/0262946 A1 | 12/2005 | Jonsson |
| 2006/0000289 A1 | 1/2006 | Jonsson |
| 2006/0070447 A1 | 4/2006 | Agami |
| 2007/0023140 A1 | 2/2007 | Grudzien |
| 2008/0245154 A1 | 10/2008 | Sekine et al. |
| 2009/0255342 A1 | 10/2009 | Grudzien |
| 2013/0189160 A1 | 7/2013 | Blankenship et al. |
| 2015/0040674 A1 | 2/2015 | Ishihara et al. |

OTHER PUBLICATIONS

A PCT/US2021/017214 Written Opinion, dated May 13, 2021, 5 pages.

A PCT/US2012/059697 International Preliminary Report on Patentability, dated Apr. 15, 2014, 6 pages.

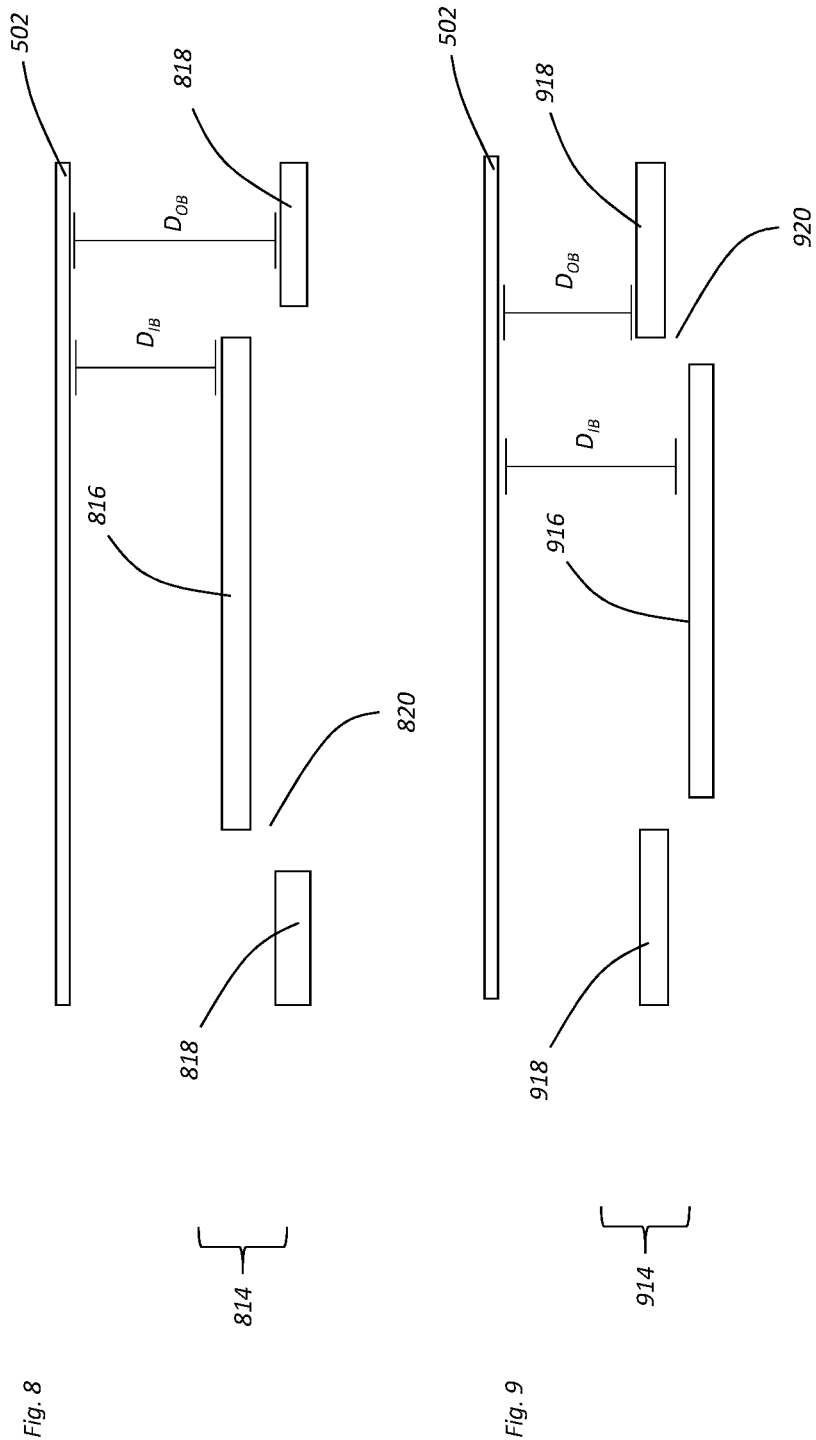

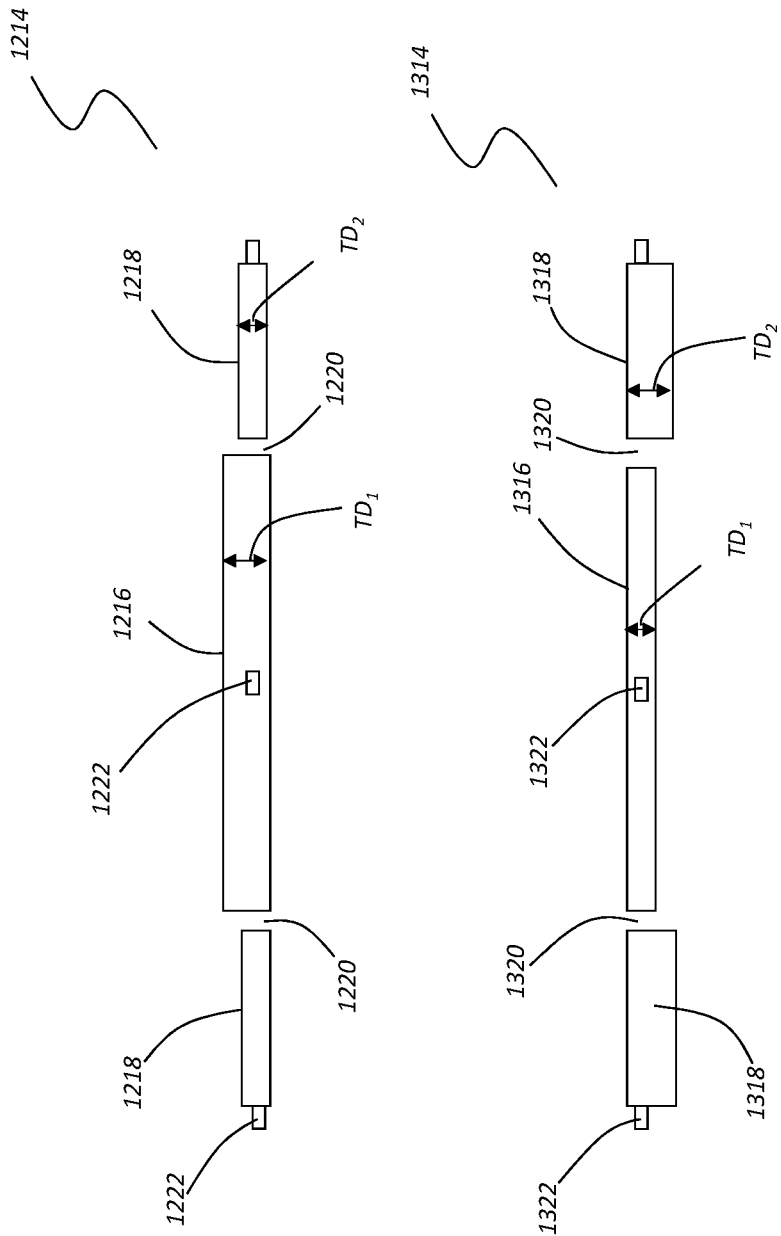

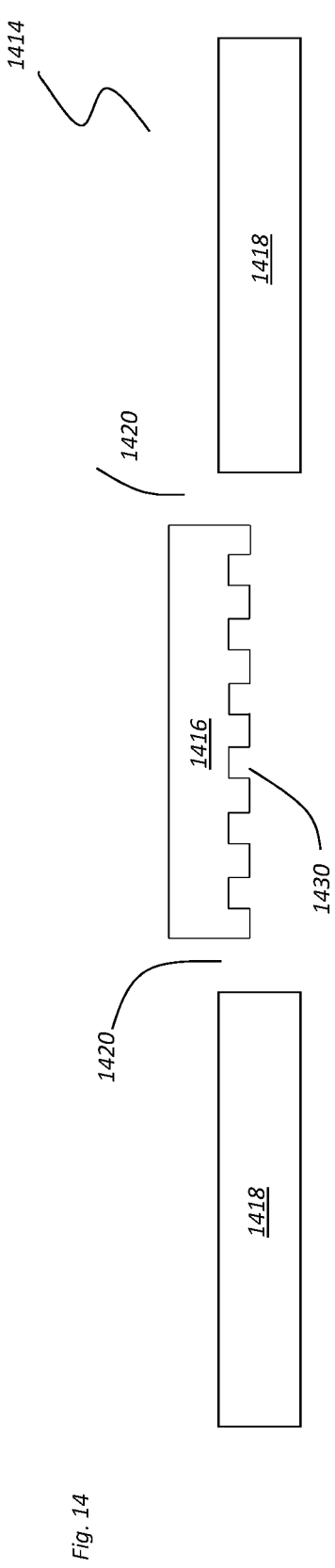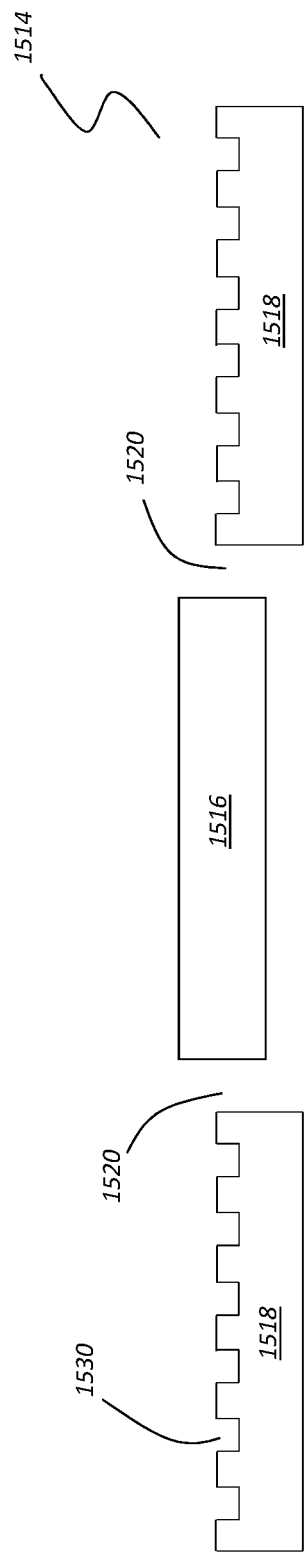

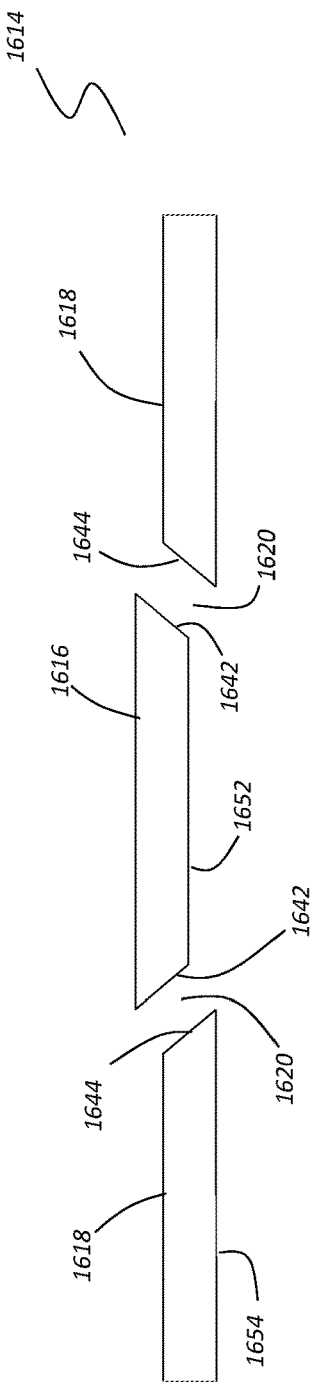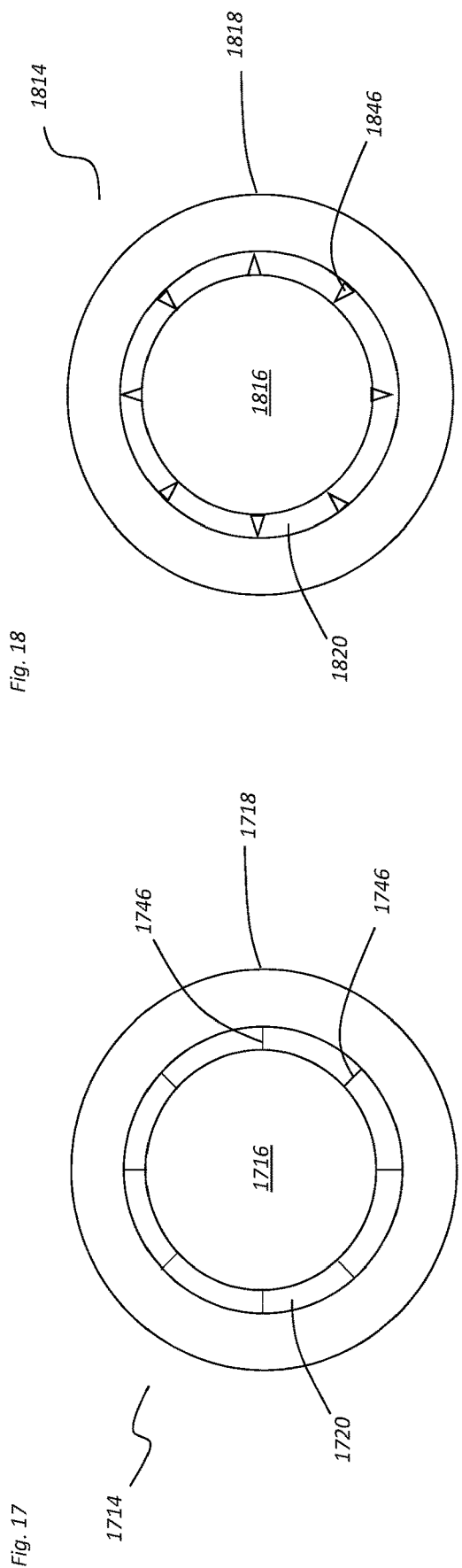

CAPACITANCE MANOMETER WITH IMPROVED BAFFLE FOR IMPROVED DETECTION ACCURACY

BACKGROUND

Presently, pressure transducers and sensors have been employed in a variety of applications. For example, semiconductor manufacturing and processing applications often employ one or more such pressure sensors (called capacitance manometers) in dry etch, physical vapor deposition, and atomic layer deposition processes. U.S. Pat. No. 8,887, 575 (hereinafter '575 reference), which is incorporated by reference in its entirety herein, discloses an exemplary prior art capacitive manometer. FIGS. 1 and 2 show two views of a prior art capacitance manometer disclosed in the '575 reference. As shown, the prior art capacitance manometer 101 includes a flexible diaphragm 103 made of conductive material or having conductive material thereon and a fixed electrode structure 105 positioned proximate to or adjacent to the flexible diaphragm 103. The electrode structure 105 includes an inner electrode structure 107 and an outer electrode structure 109. A gap 111 exists between the inner electrode structure 107 and the outer electrode structure 109 thereby permitting the electrodes to act independently. Further, a baffle 115 is positioned within the housing 123 between housing inlet 129 and the flexible diaphragm 103. FIGS. 3 and 4 show two views of an exemplary prior art baffle commonly used in capacitance manometers such as the capacitance manometer shown in the '575 reference. As shown, the planar baffle 115 includes an inner baffle structure 117 and an outer baffle structure 119. One or more baffle orifices 121 may be formed on the baffle 115. In addition, one or more coupling members 123 may be formed on or affixed to the baffle 115 to permit the baffle 115 to be attached within the enclosure 123. The flexible diaphragm 103 may be attached to an enclosure (See FIG. 2) such that the flexible diaphragm 103 separates two sub-enclosures or regions: a capacitance region 125 and a pressure measuring region 127 (See FIG. 2). In some applications, the capacitance region 125 is held at vacuum while measuring region 127 is attached to the process or vessel whose pressure is being measured. As shown in FIG. 1, one or more reactive gases or other fluids 131 from a process chamber or other similar vessel may be introduced into the pressure sensor 101 and may vary the pressure within the pressure sensor 101, thereby resulting in a difference in pressure between the capacitance region 125 and the measuring region 127. This difference in pressure may cause the flexible diaphragm 103 to deform (i.e. 103'). As a result, the deformed flexible diaphragm 103' results in a corresponding change in capacitance between the conductive material formed on the flexible diaphragm 103 and the fixed electrode structure 105. As a result, the pressure in the measuring region 127 may be determined as a function of the capacitance measurements between 103' and the electrode elements of 105.

While prior art capacitance manometer pressure sensors have proven useful in the past, a number of shortcomings have been identified. For example, very precise and accurate pressure measurements require a very narrow gap between the flexible diaphragm 103 and the fixed electrode structure 105 (hereinafter called the electrode gap) so that small changes in pressure can be detected. However, one drawback to using a very narrow electrode gap is that small changes to the shape of the electrode gap or the flexible diaphragm 103 unrelated to the measurement of differential pressure may result in a change in capacitance thereby resulting in, among other things, transient errors that are unrelated to pressure. Further, the use of reactive gases in many semiconductor processing applications results in process-related chemical reactions such as the diffusion of gas molecules or atoms into the surface of the flexible diaphragm 103. As such, it is critical to maintain good control over the electrode gap spacing in order to provide stable control over the capacitance of each measuring electrode.

In light of the foregoing, there is an ongoing need for pressure measurement systems and devices that are less prone to transient measurement errors, particularly when used with reactive gases and the like.

SUMMARY

The present application discloses various embodiments of a capacitance manometer for use in various applications. In one embodiment, the present application discloses a capacitance manometer which includes at least one electrode structure having an inner electrode structure and an outer electrode structure separated by at least one gap. Further, at least one flexible diaphragm having at least one conductive material positioned thereon or integrated therein may be positioned in movable relation to the electrode structure and in proximity to the electrode structure. In one embodiment, the flexible diaphragm is positioned adjacent to the electrode structure. In addition, at least one non-planar baffle having an inner baffle structure and an outer baffle structure separated by at least one baffle orifice may be positioned adjacent to the flexible diaphragm wherein the flexible diaphragm is positioned between the electrode structure and the baffle. One or more housings having one or more inlets coupled thereto may be used to house the electrode structure, the flexible diaphragm, and the nonplanar baffle. During use, one or more reactive gases or other fluids may be flowed into the housing via the inlet. The fluid may traverse through the baffle orifice into the region located between the baffle and the flexible diaphragm. A change in the pressure in the region located between the baffle and the flexible diaphragm may result in the flexible diaphragm deforming from a zero position to differential position when a differential pressure is applied to the diaphragm.

In another embodiment, the present application discloses another embodiment of a capacitance manometer for use in various applications. More specifically, the present application discloses a capacitance manometer which includes at least one electrode structure having an inner electrode structure and an outer electrode structure separated by at least one gap. At least one flexible diaphragm having at least one conductive material positioned thereon or formed therein may be positioned in movable relation to the electrode structure. The flexible diaphragm may be positioned adjacent to the electrode structure. Further, a baffle having an inner baffle structure, an outer baffle structure, and at least one baffle orifice formed thereon may be positioned adjacent to the flexible diaphragm. In addition, the electrode structure, the flexible diaphragm, and the baffle may be positioned within the housing having at least one inlet coupled thereto.

Other features and advantages of the capacitance manometer as described herein will become apparent from a consideration of the following detailed description.

BRIEF DESCRIPTION OF THE DRAWINGS

The drawings disclose illustrative embodiments and are not intended to set forth all embodiments of the capacitance manometer. Details that may be apparent or unnecessary may be omitted to save space or for more effective illustration. Conversely, some embodiments may be practiced without all the details disclosed with regard to specific embodiments. When the same reference numbers appears in different drawings, the reference number refers to the same or like components or steps. The novel aspects of the capacitance manometer as disclosed herein will become apparent by consideration of the following figures, wherein:

FIG. 8 shows a side view of an embodiment of a nonplanar baffle for use in a capacitance manometer shown in FIG. 5 wherein the inner baffle structure is positioned in closer proximity to the electrode structure than the outer baffle structure;

FIG. 9 shows a side view of another embodiment of a nonplanar baffle for use in a capacitance manometer shown in FIG. 5 wherein the outer baffle structure is positioned in closer proximity to the electrode structure than the inner baffle structure;

FIG. 12 shows a side view of the embodiment of the nonplanar baffle for use in the capacitance manometer shown in FIG. 11;

FIG. 13 shows a side view of another embodiment of the nonplanar baffle for use in the capacitance manometer shown in FIG. 11;

FIG. 14 shows a side view of an embodiment of a nonplanar baffle for use in a capacitance manometer, the nonplanar baffle having inner baffle structure having one or more flow directing devices or structures formed thereon;

FIG. 15 shows a side view of an embodiment of a nonplanar baffle for use in a capacitance manometer, the nonplanar baffle having outer baffle structure having one or more flow directing devices or structures formed thereon;

FIG. 16 shows a side view of another embodiment of a nonplanar baffle for use in a capacitance manometer, the nonplanar baffle having flow directing baffle orifices formed thereon;

FIG. 17 shows a top planar view of another embodiment of a nonplanar baffle for use in a capacitance manometer, the nonplanar baffle having flow directing devices formed within a baffle orifice formed on the nonplanar baffle;

FIG. 18 shows a top planar view of another embodiment of a nonplanar baffle for use in a capacitance manometer, the nonplanar baffle having flow directing devices formed within a baffle orifice formed on the nonplanar baffle.

DESCRIPTION

The present application discloses various embodiments of a capacitance manometer. Those skilled in the art will appreciate that the various features and elements of the capacitance manometer disclosed herein may be incorporated in any variety of pressure sensing devices.

Figure 1:
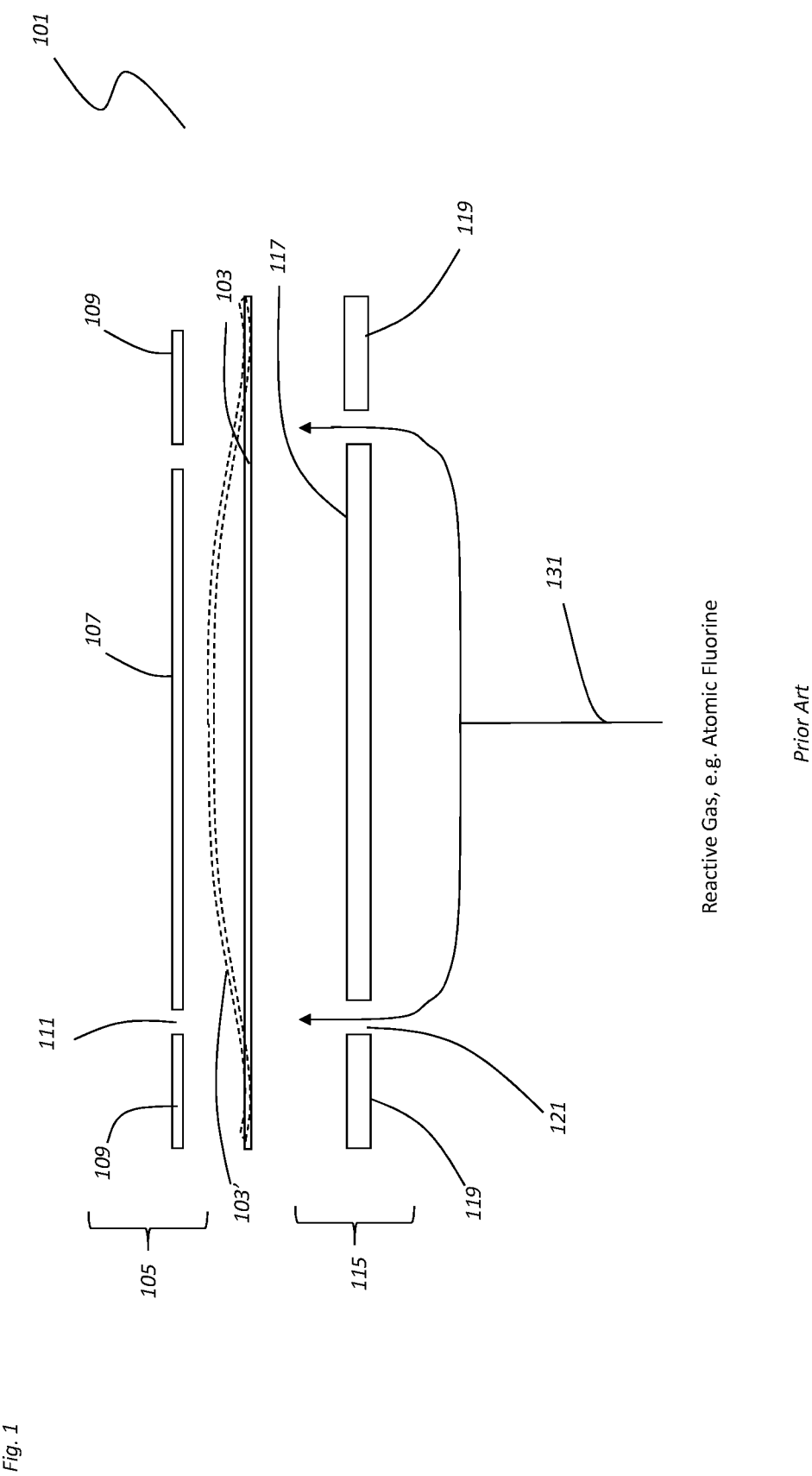
FIG. 1 shows a cross-sectional view of an embodiment of a prior art pressure sensor.
Figure 2:
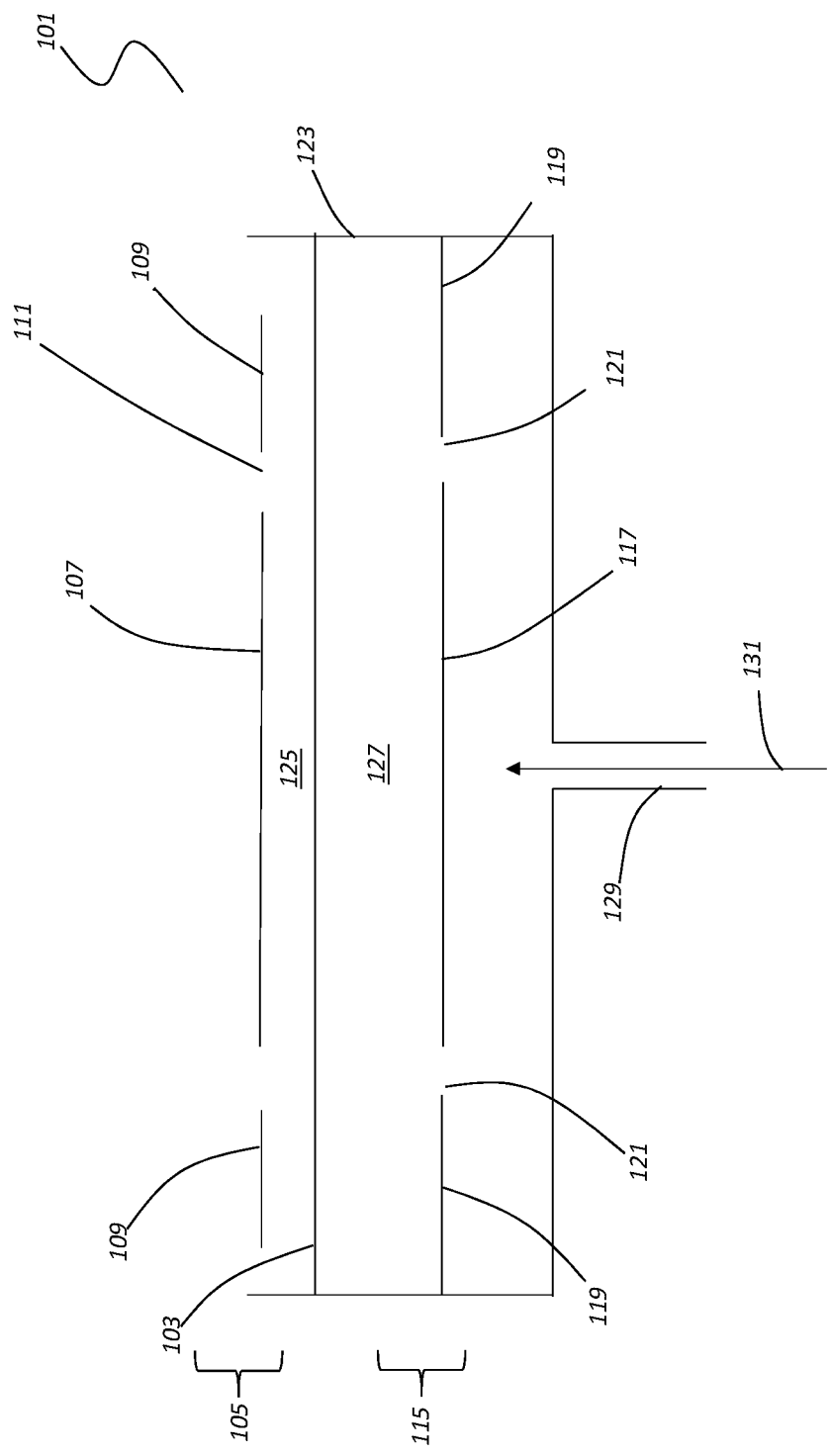
FIG. 2 shows an alternate view of the embodiment of the prior art pressure sensor shown in FIG. 1.
Figure 4:
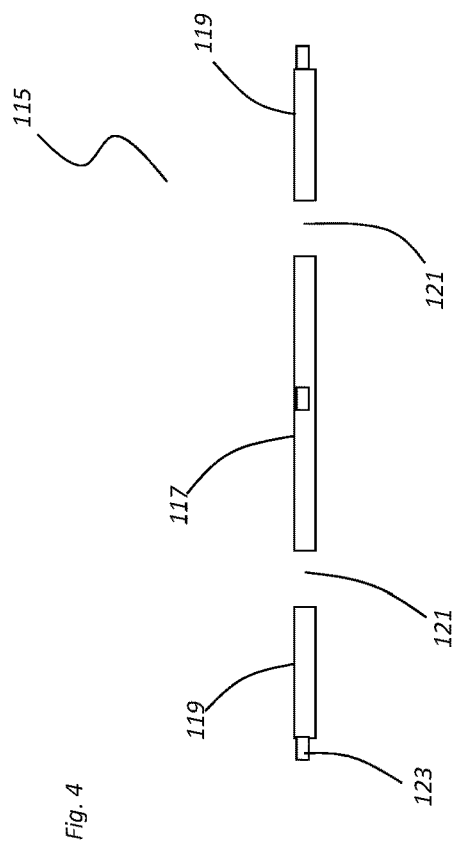
FIG. 4 shows a side view of a baffle used in the prior art embodiments of the pressure sensors shown in FIGS. 1 and 2.
Figure 3:
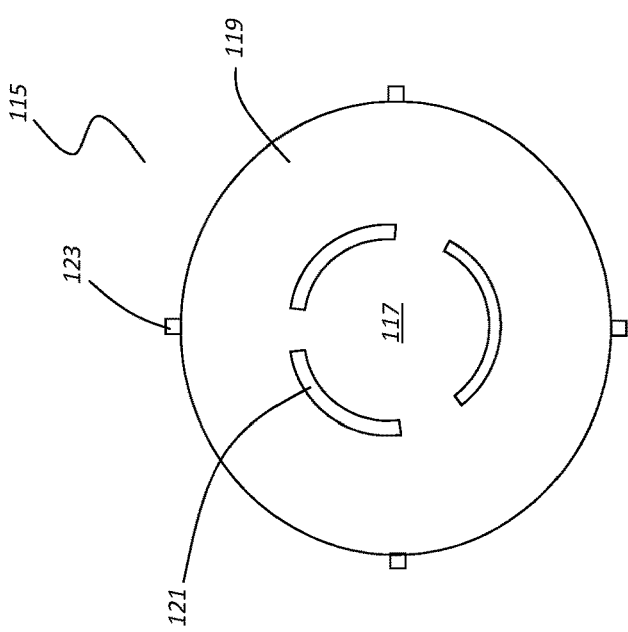
FIG. 3 shows a top planar view of a baffle used in the prior art embodiments of the pressure sensors shown in FIGS. 1 and 2.
Figure 5:
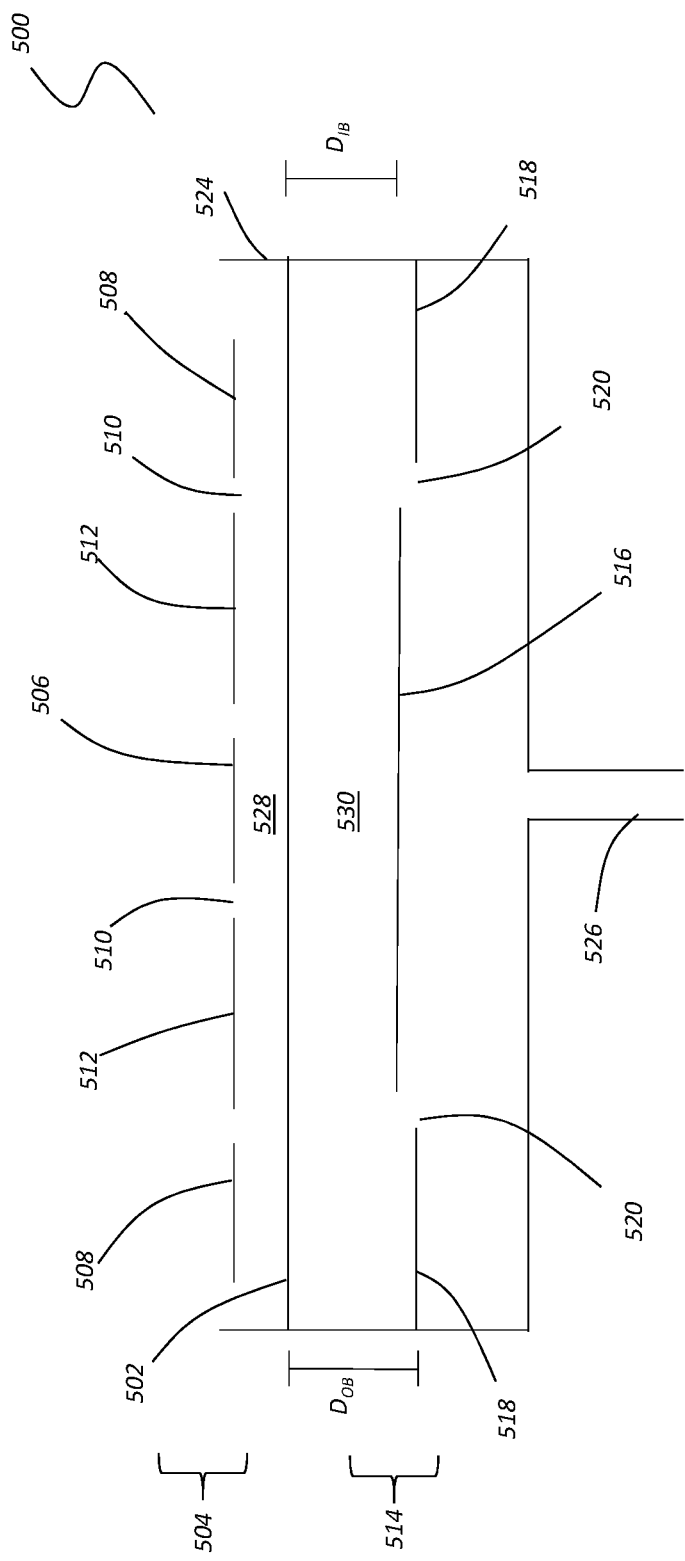
FIG. 5 shows a cross-sectional view of an embodiment of a novel capacitance manometer having a nonplanar baffle.

FIG. 5 shows a cross-sectional view of an embodiment of capacitance manometer. As shown, capacitance manometer 500 includes at least one flexible diaphragm 502 positioned between at least one electrode structure 504 and at least one baffle 514. In one embodiment, the flexible diaphragm 502 includes at least one conductive structure positioned thereon or conductive material therein. Further, in one embodiment, the flexible diaphragm 502 is positioned in close proximity to and adjacent to the electrode structure 504. In the illustrated embodiment the electrode structure 504 includes an inner electrode structure 506 and at least one outer electrode structure 508. The inner electrode structure 506 may be separated from the outer electrode structure 508 by at least one gap 510. Optionally, the electrode structure 504 may be manufactured without a gap 510. In the illustrated embodiment, at least one guard structure or device 512 may be positioned within or adjacent to the gap 510. Optionally, the electrode structure 504 may be manufactured without a guard structure 512. A capacitance is established within the at least one capacitance region 528 formed between the conductive material of the flexible diagram 502 and the electrode structure 504. Further, variations in pressure on one side of the flexible diaphragm 502 relative to the pressure on the opposite side of the flexible diaphragm 502 results in the flexible diaphragm 502 deforming or otherwise flexing such that the capacitance between the fixed electrode structure 504 and the flexible diaphragm 502 varies as a function of the differential pressure.

Referring again to FIG. 5, the baffle 514 may be positioned adjacent to or proximate to the flexible diaphragm 502. As shown, at least one measuring region 530 may be formed between the baffle 514 and the flexible diaphragm 502. As shown, the baffle 514 may include at least one inner baffle structure 516 and at least one outer baffle structure 518. Further, at least one baffle orifice or gap 520 may be positioned between or formed between the inner baffle structure 516 and the outer baffle structure 518. In the illustrated embodiment, at least a portion of the baffle orifice 520 may be colinearly aligned with at least a portion of the gap 510 formed on the electrode structure 504, although those skilled in the art will appreciate that the baffle orifice 520 need not be aligned with the gap 510 formed on the electrode structure 504. During use, the baffle orifice 520 may be configured to permit one or more gases and/or fluids to flow into the measuring region 530 formed between the baffle 514 and the flexible diaphragm 502. Further, as shown in FIG. 5, the inner baffle structure 516 may be displaced from the outer baffle structure 518. In the illustrated embodiment the distance $D_{IB}$ between inner baffle structure 516 and the diaphragm 502 is less than the distance $D_{OB}$ between the outer baffle structure 518 and the flexible diaphragm 502. As such, the displacement of the inner baffle structure 516 from the outer baffle structure 518 forms a non-planar baffle 514.

As shown in FIG. 5, the flexible diaphragm 502, electrode structure 504, and the baffle 514 may be positioned or contained within at least one housing 524 having one or more inlets 526 coupled thereto. During use, the flexible diaphragm 502 has zero position when the pressure between the flexible diaphragm 502 and the baffle 514 (i.e. the pressure within the measuring region 530) is equal to the pressure between the flexible diaphragm 502 and the electrode structure 504 (i.e. the pressure within the capacitance region 528). Thereafter, at least one fluid may be directed into the housing 524 via the inlet 526. The fluid may be introduced into the region adjacent to the flexible diaphragm 502 via the baffle orifice 520 or at any desired location. Introduction of sufficient pressure in the measuring region 530 may result in a deformation of the flexible diaphragm 502 wherein the flexible diaphragm 502 assumes a position consistent with the pressure difference between the measuring region and the capacitance region. More specifically, when the flexible diaphragm 502 is in the differential position the distance between conductive material of the flexible diaphragm 502 and electrode structure 504 is varied as compared with the zero-position described above which results in a corresponding change in the capacitance formed by the conductive material of the diaphragm 502 and the electrode structure 504. Thereafter, as known in the art, the user may calculate the pressure measurement based on the change in capacitance.

Figure 7:
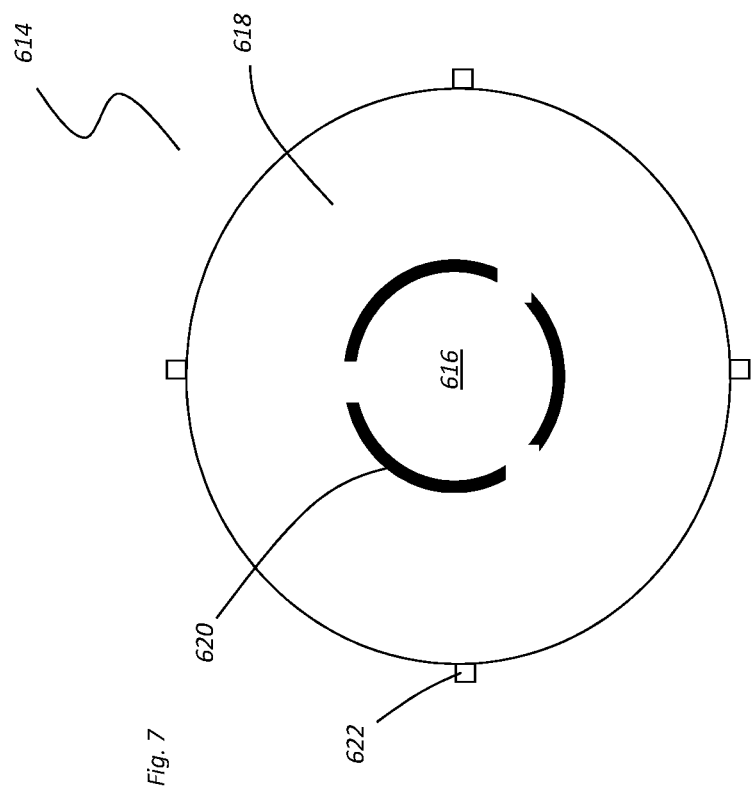
FIG. 7 shows a plan view of an embodiment of the nonplanar baffle used in the capacitance manometer shown in FIG. 5.
Figure 6:
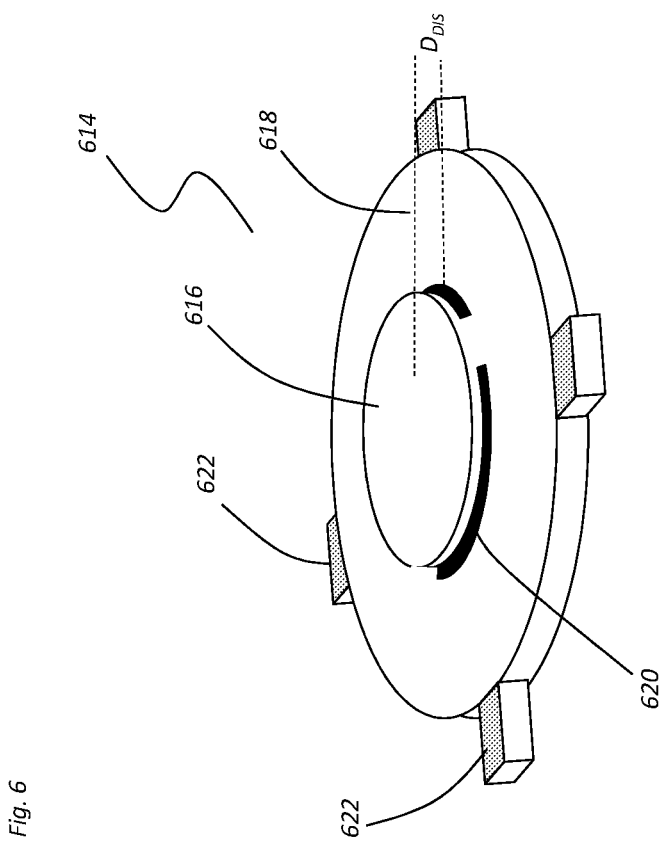
FIG. 6 shows an elevated perspective view and embodiment of the nonplanar baffle for use in the capacitance manometer shown in FIG. 5.

FIGS. 6 and 7 show various views of the embodiment of the nonplanar baffle shown in FIG. 5 configured for use in a capacitance manometer or any desired pressure sensing device which includes at least one baffle therein. As shown, the baffle 614 includes an inner baffle structure 616 and an outer baffle structure 618. In the illustrated embodiment the inner baffle structure 616 is displaced from the outer baffle structure 618 by a distance $D_{DIS}$, although those skilled in the art will appreciate that the inner baffle structure 616 may be displaced from the outer baffle structure 618 by any distance. Further, one or more orifices 620 may be formed on the baffle 614. In addition, one or more coupling members 622 may be included on the baffle 614 to enable the baffle 614 to be coupled to a housing or similar structure (not shown).

FIGS. 8 and 9 show alternate embodiments of the nonplanar baffle configured for use in a capacitance manometer or similar pressure sensing device shown in FIG. 5. As shown in FIG. 8, the nonplanar baffle 814 includes an inner baffle structure 816 and an outer baffle structure 818. Like the previous embodiments, the baffle 814 may include one or more orifices 820 formed thereon or therein. In the illustrated embodiment, a baffle orifice 820 is positioned between the inner baffle structure 816 and the outer baffle structure 818. Further, the inner baffle structure 816 is positioned distance $D_{IB}$ from the diaphragm 502 (see FIG. 5), while the outer baffle structure 818 is positioned distance $D_{OB}$ from the diaphragm 502, wherein distance $D_{IB}$ is less than distance $D_{OB}$. In contrast, FIG. 9 shows an alternate embodiment of the nonplanar baffle. As shown, the nonplanar baffle 914 includes an inner baffle structure 916 in an outer baffle structure 918. The baffle 914 includes one or more orifices 920 formed thereon or therein. In the illustrated embodiment, the inner baffle structure 916 is positioned distance $D_{IB}$ from the diaphragm 502, while the outer baffle structure 918 is positioned distance $D_{OB}$ from the diaphragm 502, wherein distance $D_{OB}$ is less than distance $D_{IB}$.

Figure 10:
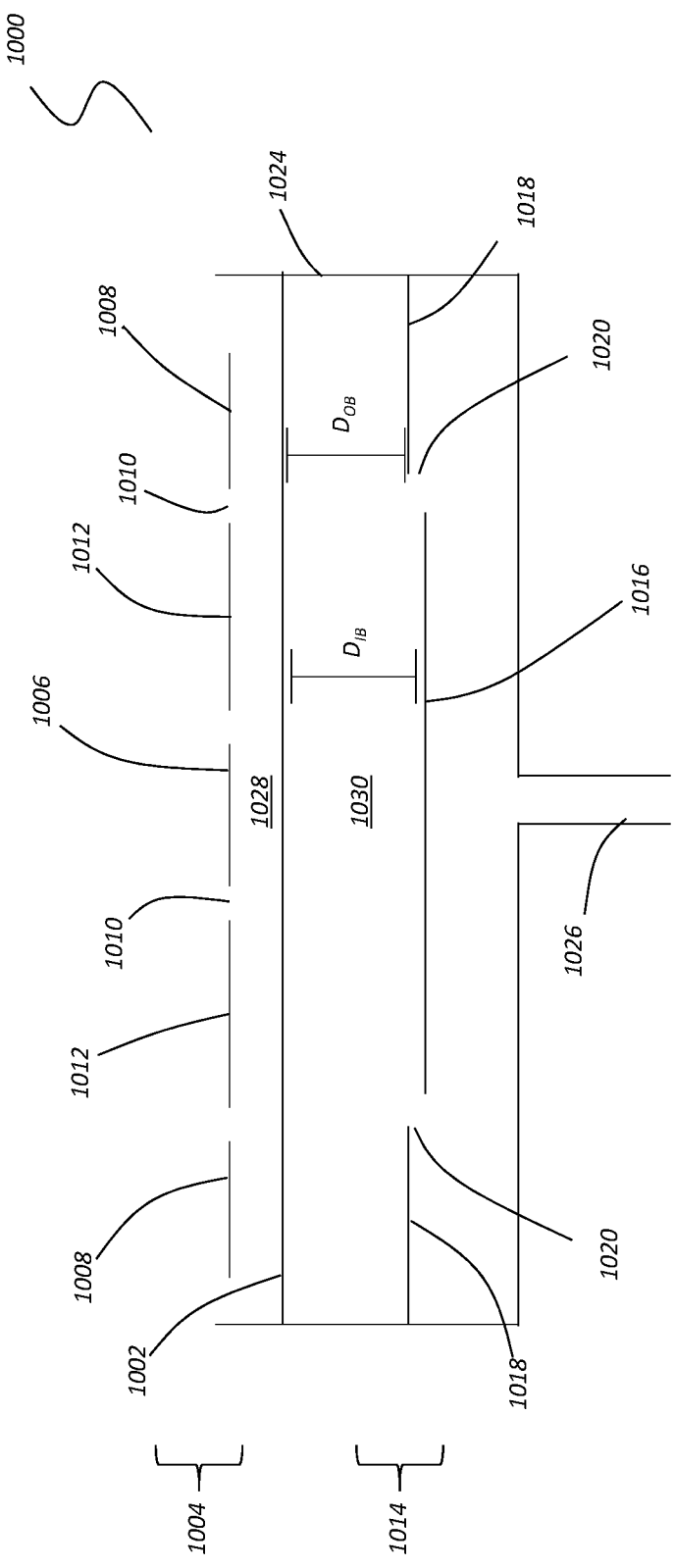
FIG. 10 shows a cross-sectional view of another embodiment of a novel capacitance manometer having a nonplanar baffle.

FIG. 10 shows another embodiment of capacitance manometer. As shown, the capacitance manometer 1000 includes at least one flexible diaphragm 1002 having at least one conductive device or conductive material therein. Further, the diaphragm 1002 is positioned between at least one electrode structure 1004 and at least one baffle 1014. As shown, at least one capacitance region 1028 may be formed between the flexible diaphragm 1002 and the electrode structure 1004. Like the previous embodiments, electrode structure 1004 includes at least one inner electrode structure 1006 and at least one outer electrode structure 1008. The inner electrode structure 1006 may be separated from the outer electrode structure 1008 by at least one gap 1010. At least one guard structure or similar device 1012 may be positioned within the gap 1010.

Referring again to FIG. 10, at least one measuring region 1030 may be formed between the flexible diaphragm 1002 and the baffle 1014. The baffle 1014 comprises at least one nonplanar body. More specifically, the baffle 1014 includes at least one inner baffle structure 1016 and at least one outer baffle structure 1018. As shown, the inner baffle structure 1016 is displaced from the outer baffle structure 1018 thereby forming the nonplanar baffle. More specifically, the inner baffle structure 1016 is positioned a distance $D_{IB}$ from the flexible diaphragm 1002. Further, the outer baffle structure 1018 is positioned a distance $D_{OB}$ from the flexible diaphragm 1002 wherein distance $D_{OB}$ is less than distance $D_{IB}$.

Figure 11:
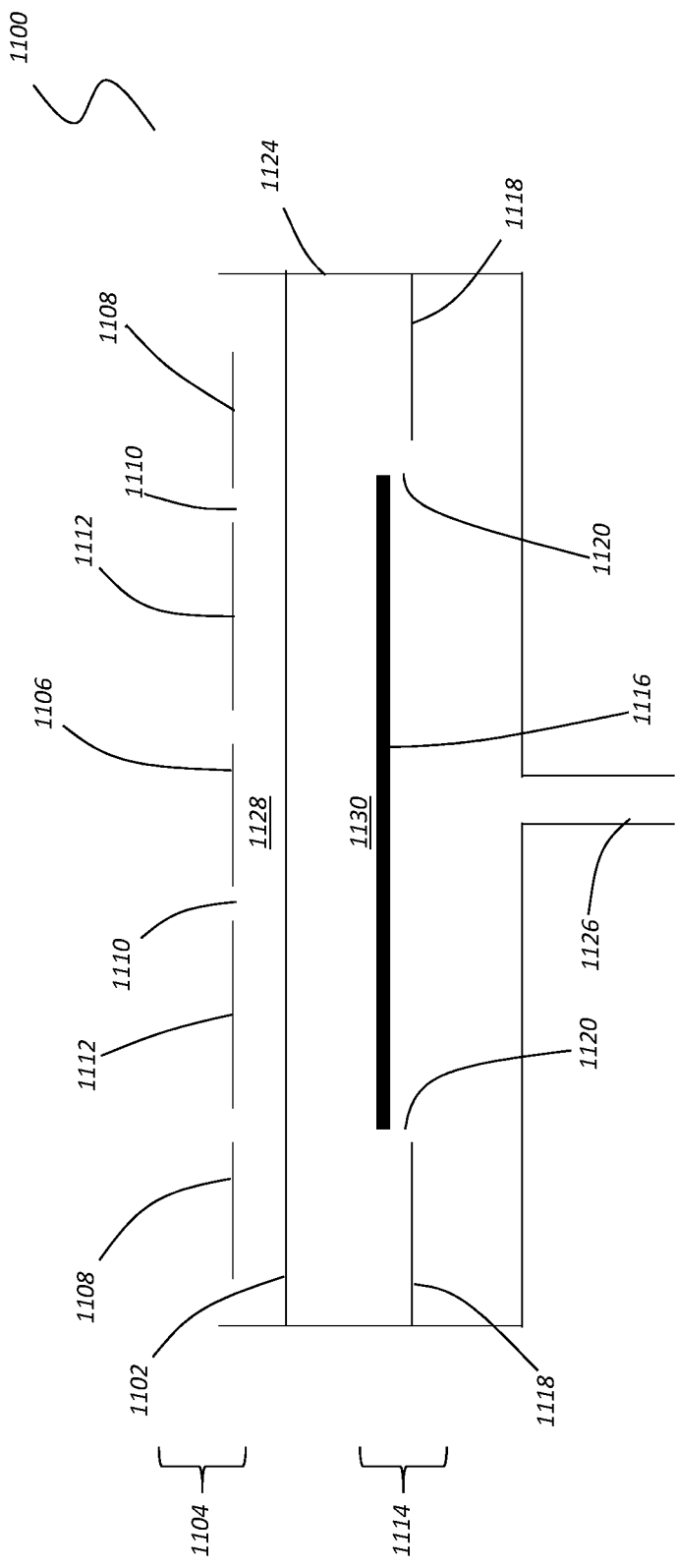
FIG. 11 shows a cross-sectional view of another embodiment of a capacitance manometer having a nonplanar baffle wherein the transverse dimension of the nonplanar baffle is non-uniform.

FIGS. 11-13 show various views of an alternate embodiment of a capacitance manometer. As shown in FIG. 11, capacitance manometer 1100 may include at least one flexible diaphragm 1102 positioned between at least one electrode structure 1104 and at least one baffle 1114. Like the previous embodiments, the flexible diaphragm 1102 may include at least one conductive device or material thereon or formed therein. Again, at least one capacitance region 1128 may be formed between the flexible diaphragm 1102 and the electrode structure 1104. The electrode structure 1104 may include at least one inner electrode structure 1106 separated from at least one outer electrode structure 1108 by at least one gap 1110. Optionally, one or more guard structures or electrode elements 1112 maybe positioned within the gap 1110. At least one measuring region 1130 may be formed between the flexible diaphragm 1102 and the baffle 1114. As shown, the baffle 1114 has a non-uniform transverse dimension. More specifically, the baffle 1114 includes at least one inner baffle structure 1116 and at least one outer baffle structure 1118. At least one baffle orifice 1120 may be formed on the baffle 1114. In the illustrated embodiment, the baffle orifice 1120 separates the inner baffle structure 1116 from the outer baffle structure 1118. As shown, the inner baffle structure 1116 has a transverse dimension (thickness) greater than the transverse dimension of the outer baffle structure 1118. The specifics of the baffle 1114 shown in FIG. 11 will be described in greater detail in FIGS. 12 and 13. Referring again to FIG. 11, the flexible diaphragm 1102, electrode structure 1104, and/or the baffle 1114 may be positioned within at least one housing 1124 which is in communication with at least one inlet 1126 configured to provide at least one gas or other fluid to the capacitance manometer 1100.

FIGS. 12 and 13 show alternate embodiments of a nonplanar baffle having non-uniform transverse dimensions configured for use in the capacitance manometer described above and shown in FIG. 11. As shown in FIG. 12, the nonplanar baffle 1214 includes inner baffle structure 1216 having a transverse dimension $T_{D1}$. In addition, the nonplanar baffle 1214 includes an outer baffle structure 1218 having a transverse dimension $T_{D2}$, wherein transverse dimension $T_{D1}$ is greater than transverse dimension $T_{D2}$. One or more baffle orifices 1220 may be formed or positioned between the inner baffle structure 1216 and the outer baffle structure 1218. One or more coupling devices or features 1222 may be formed on various portions of the baffle 1214. Coupling devices include clips, pins, tabs, body extensions, and the like. In contrast, FIG. 13 shows another embodiment of a nonplanar baffle 1314 which includes inner baffle structure 1316 having a transverse dimension $T_{D1}$. In addition, the nonplanar baffle 1314 includes an outer baffle structure 1318 having a transverse dimension $T_{D2}$, wherein transverse dimension $T_{D1}$ is less than transverse dimension $T_{D2}$. One or more baffle orifices 1320 may be formed or positioned between the inner baffle structure 1316 and the outer baffle structure 1318. One or more coupling devices or features 1322 may be formed on various portions of the baffle 1314.

FIGS. 14 and 15 show alternate embodiments of a baffle configured for use in the capacitance manometer as shown in FIG. 5. As shown in FIG. 14, the nonplanar baffle 1414 includes an inner baffle structure 1416 and an outer baffle structure 1418. Like the previous embodiments, at least one baffle orifice 1420 may be formed in the nonplanar baffle 1414. In the illustrated embodiment, the baffle orifice 1420 may be positioned between the inner baffle structure 1416 the outer baffle structure 1418. Again, like the previous embodiments, the inner baffle structure 1416 is displaced from the outer baffle structure 1418. Optionally, the inner baffle structure 1416 need not be displaced from the outer baffle structure 1418 thereby forming a planar baffle structure. Further, at least one surface feature, flow directing device, or channel 1430 may be formed on at least one surface of the inner baffle structure 1416. FIG. 15 shown an alternate embodiment of a baffle configured for use in a capacitance manometer. The baffle 1514 includes at least one inner baffle structure 1516 and at least one outer baffle structure 1518. At least one baffle orifice 1520 is formed on the baffle 1514. The illustrated embodiment, the inner baffle structure 1516 is displaced from the outer baffle structure 1518. Further, at least one surface feature or channel 1530 may be formed on at least one outer baffle structure 1518. Optionally, surface features, flow directing devices, or channels 1530 may be formed on any surface of the outer baffle structure 1518. In another embodiment, surface features or channels may be formed on any surface of either the inner baffle structure 1516, the outer baffle structure 1518, or both. During use the surface feature or channel 1530 may be configured to assist or otherwise modify the flow of fluids through the baffle 1514.

FIG. 16 shows a cross-sectional view of another embodiment of a baffle for use in a capacitance manometer. As shown, the nonplanar baffle 1614 includes an inner baffle structure 1616 and an outer baffle structure 1618. As shown, at least one baffle orifice 1620 is cooperatively formed by the angled surface 1642 formed on the inner baffle structure 1616 and the angled surface 1644 formed on the outer baffle structure 1618. More specifically, the angled surface 1642 may be non-orthogonal to the surface 1652 formed on the inner baffle structure 1616. Similarly, the angled surface 1644 may be nonorthogonal to the surface 1654 formed on the outer baffle structure 1618. Further, those skilled in the art will appreciate that the baffle orifice 1620 may be formed in any variety of shapes, transverse dimensions, or configurations and may include one or more surface discontinuities or flow disrupting elements therein.

FIGS. 17 and 18 show top views of alternate embodiments of a baffle for use in a capacitance manometer. As shown in FIG. 17, the baffle 1714 includes an inner baffle structure 1716 and an outer baffle structure 1718. One or more baffle orifices are formed on the baffle 1718. As shown, at least one flow directing device or structure 1746 may be positioned within or proximal to the baffle orifice 1720. In the illustrated embodiment, the flow directing device or structure 1746 comprises one or more vanes positioned within or proximate to the baffle orifice 1720. In one embodiment, the baffle 1714 comprises a non-planar baffle wherein the inner baffle structure 1716 is displaced from the outer baffle structure 1718. In contrast, FIG. 18 shows an alternate embodiment of a baffle. Like the previous embodiment, the baffle 1814 includes an inner baffle structure 1816 in an outer baffle structure 1818 having at least one baffle orifice 1820 positioned there between. One or more flow directing devices or structures 1846 may be position within or proximate to the baffle orifice 1820 and configured to disrupt or disperse the flow of a fluid through the baffle orifice 1820.

Figure 19:
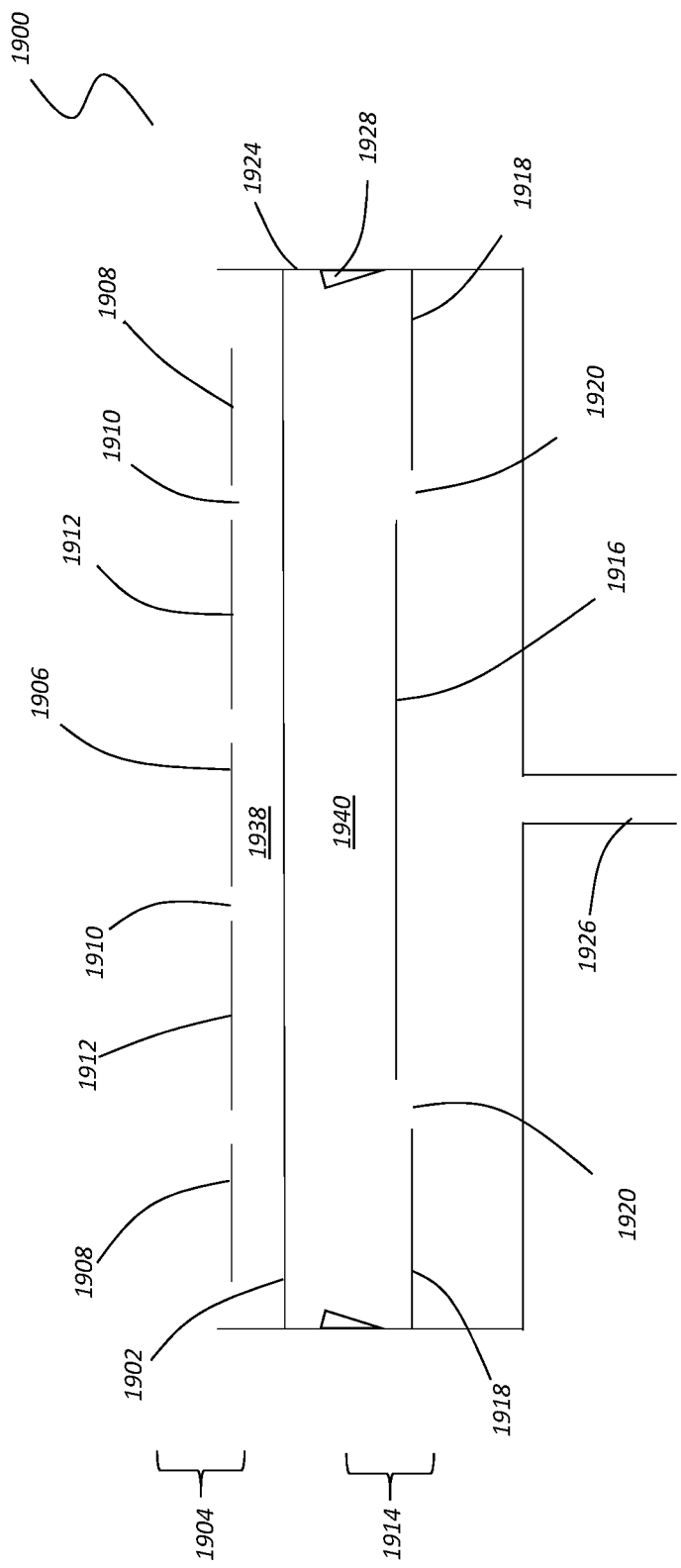
FIG. 19 shows a cross-sectional view of another embodiment of a capacitance manometer wherein the electrode structure, the flexible diaphragm, and the nonplanar baffle are positioned within housing, the housing having one or more flow directing structures or devices formed thereon.

FIG. 19 shows a cross-sectional view of another embodiment of a capacitance manometer. As shown, the capacitance manometer 1900 includes at least one flexible diaphragm 1902 having at least one conductive device or material thereon positioned between at least one electrode structure 1904 and at least one baffle 1914. As shown, at least one capacitance region 1938 may be formed between the flexible diaphragm 1902 and the electrode structure 1904. Like the previous embodiments, the electrode structure 1904 includes at least one inner electrode structure 1906 and at least one outer electrode structure 1908 separated by at least one gap 1910. Optionally, one or more guard devices or structures 1912 may be positioned within or proximate to the gap 1910. At least one baffle may be positioned proximate to the flexible diaphragm 1902. As shown, at least one measuring region 1940 may be formed between the flexible diaphragm 1902 and the baffle 1914. The baffle 1914 includes at least one inner baffle structure 1916 and at least one outer baffle structure 1918. One or more baffle orifices 1920 may be formed on the baffle 1914. The illustrated embodiment, the inner baffle structure 1916 is displaced from the outer baffle structure 1918 thereby forming a nonplanar baffle. The flexible diaphragm 1902, electrode structure 1904, and nonplanar baffle 1914 may be positioned within a housing 1924 having at least one inlet 1926 coupled thereto and configured to provide at least one fluid to the housing 1924. In addition, one or more housing flow directing devices or structures 1928 may be formed on at least one surface of the housing 1924. During use, the housing flow directing devices or structures 1928 may be configured to selectively direct flow of the fluid from the baffle orifice 1920 into the region formed between the flexible diaphragm 1902 in the nonplanar baffle 1914.

While particular forms of embodiments have been illustrated and described, it will be apparent that various modifications can be made without departing from the spirit and scope of the embodiments of the invention. Accordingly, is not intended that the invention be limited by the foregoing detailed description.

What is claimed:

1. A capacitance manometer assembly, comprising:
   at least one electrode structure having at least one inner electrode structure and at least one outer electrode structure, the at least one inner electrode structure separated from the at least one outer electrode structure by at least one gap;

at least one flexible diaphragm being made of conductive material or having at least one conductive material positioned thereon, the at least one flexible diaphragm movable in relation to the electrode structure having a zero position when pressure on each side of the flexible diaphragm is the same and at least one differential position when a differential pressure is applied to the flexible diaphragm; and at least one nonplanar baffle having at least one inner baffle structure, at least one outer baffle structure, and at least one baffle orifice formed thereon, wherein the inner baffle structure is displaced from the outer baffle structure.

2. The capacitance manometer assembly of claim 1 further comprising at least one guard structure positioned within the at least one gap.

3. The capacitance manometer of claim 1 wherein the at least one inner baffle structure is positioned a distance $D_{IB}$ from the at least one flexible diaphragm, and the outer baffle structure is positioned a distance $D_{OB}$ from the at least one flexible diaphragm wherein distance $D_{IB}$ is less than distance $D_{OB}$.

4. The capacitance manometer of claim 1 wherein the at least one inner baffle structure is positioned a distance $D_{IB}$ from the at least one flexible diaphragm, and the outer baffle structure is positioned a distance $D_{OB}$ from the at least one flexible diaphragm wherein distance $D_{IB}$ is greater than distance $D_{OB}$.

5. The capacitance manometer of claim 1 further comprising at least one flow directing structure formed on at least one surface of the at least one inner baffle structure.

6. The capacitance manometer of claim 1 further comprising at least one flow directing structure formed on at least one surface of the at least one outer baffle structure.

7. The capacitance manometer of claim 1 further comprising at least one flow directing structure formed on at least one surface of the at least one inner baffle structure and on at least one surface of the at least one outer baffle structure.

8. The capacitance manometer of claim 1 further comprising at least one flow directing structure formed within the at least one baffle orifice.

9. The capacitance manometer of claim 1 wherein the at least one inner baffle structure and at least one outer baffle structure are parallel.

10. The capacitance manometer of claim 1 further comprising at least one housing having at least one inlet form therein, the at least one housing configured to contain and support the at least one electrode structure, the at least one flexible diaphragm, and at least one nonplanar baffle therein.

11. The capacitance manometer of claim 1 further comprising at least one flow directing structure formed on at least one surface of the at least one housing.

12. A capacitance manometer assembly, comprising:

at least one electrode structure having at least one inner electrode structure and at least one outer electrode structure, the at least one inner electrode structure separated from the at least one outer electrode structure by at least one gap;

at least one flexible diaphragm having at least one conductive material positioned thereon, the at least one flexible diaphragm movable in relation to the electrode structure having a zero position when pressure on each side of the flexible diaphragm is the same and at least one differential position when a differential pressure is applied to the flexible diaphragm;

at least one nonplanar baffle having at least one inner baffle structure, at least one outer baffle structure, and at least one baffle orifice form thereon, wherein the inner baffle structure is displaced from the outer baffle structure; and at least one housing having at least one inlet form therein, the at least one housing configured to contain and support the at least one electrode structure, the at least one flexible diaphragm, and at least one nonplanar baffle therein.

13. The capacitance manometer assembly of claim 12 further comprising at least one guard structure positioned within the at least one gap.

14. The capacitance manometer of claim 12 wherein the at least one inner baffle structure is positioned a distance $D_{IB}$ from the at least one flexible diaphragm, and the outer baffle structure is positioned a distance $D_{OB}$ from the at least one flexible diaphragm wherein distance $D_{IB}$ is greater than distance $D_{OB}$.

15. The capacitance manometer of claim 12 further comprising at least one flow directing structure formed on at least one surface of the at least one inner baffle structure.

16. The capacitance manometer of claim 12 further comprising at least one flow directing structure formed on at least one surface of the at least one outer baffle structure.

17. The capacitance manometer of claim 12 further comprising at least one flow directing structure formed on at least one surface of the at least one inner baffle structure and on at least one surface of the at least one outer baffle structure.

18. The capacitance manometer of claim 12 further comprising at least one flow directing structure formed within the at least one baffle orifice.

19. The capacitance manometer of claim 12 wherein the at least one inner baffle structure and at least one outer baffle structure are parallel.

20. The capacitance manometer of claim 12 further comprising at least one flow directing structure formed on at least one surface of the at least one housing.

* * * * *